(12) United States Patent
Noda (10) Patent No.: US 6,259,570 B1
(45) Date of Patent: Jul. 10, 2001

(54) IMAGE READOUT LENS

(75) Inventor: Takayuki Noda, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/407,089

(22) Filed: Sep. 28, 1999

(30) Foreign Application Priority Data

Oct. 21, 1998  (JP) .................................. 10-299670

(51) Int. Cl.[7] .............................. G02B 9/14; G02B 13/18
(52) U.S. Cl. .......................... 359/785; 359/716; 359/790
(58) Field of Search .................... 359/716, 785, 359/790

(56) References Cited

U.S. PATENT DOCUMENTS 6,111,704 * 8/2000 Noda et al. ........................ 359/790

FOREIGN PATENT DOCUMENTS 4-288512  10/1992  (JP) .
4-296808  10/1992  (JP) .

* cited by examiner

*Primary Examiner*—Georgia Epps
*Assistant Examiner*—David N. Spector (74) *Attorney, Agent, or Firm*—Snider & Associates; Ronald R. Snider (57) ABSTRACT

An image readout lens comprises, successively from the object side, a first lens $L_1$ made of a positive meniscus lens having a convex surface directed onto the object side, a second lens $L_2$ made of a biconcave lens having a surface with a greater curvature directed onto the object side, and a third lens $L_3$ made of a biconvex lens having a surface with a greater curvature directed onto the image side, the first lens $L_1$ and second lens $L_2$ each being a plastic lens with aspheric surfaces on both sides. The image readout lens satisfies the following conditional expressions (1) and (3) to (5):

$$0.08 < D_6/F < 0.2 \qquad (1)$$

$$1.5 < |R_6|/F < 2.2 \qquad (3)$$

$$0.5 < R_2/F < 1.55 \qquad (4)$$

$$0.5 < R_4/F < 1.2 \qquad (5)$$

where $D_6$ is the center thickness of the third lens, $R_j$ (j=1 to 7) is the radius of curvature of the j-th surface from the object side, and F is the focal length of the whole lens system. Thus obtained is a high-performance, high-resolution image readout lens suitable for reading out color images, which reduces its cost and weight by using a plastic material, while suppressing deviations in its imaging position upon changes in temperature.

9 Claims, 10 Drawing Sheets

FIG. 1
EXAMPLE 1

← OBJECT SIDE   IMAGE SIDE →

FIG. 2
EXAMPLE 9

← OBJECT SIDE   IMAGE SIDE →

FIG.4A EXAMPLE 2 F=6.07

FIG.4B EXAMPLE 2 ω=18.5°

FIG.4C EXAMPLE 2 ω=18.5°

—— SAGITTAL
---- TANGENTIAL

FIG.9C EXAMPLE 7 ω=18.5°

FIG.9B EXAMPLE 7 ω=18.5°

—— SAGITTAL
---- TANGENTIAL

FIG.9A EXAMPLE 7 F=6.07

FIG. 10A EXAMPLE 8 F=6.25
FIG. 10B EXAMPLE 8 ω=22.0°
FIG. 10C EXAMPLE 8 ω=22.0°

FIG.11C
EXAMPLE 9
ω=18.5°
DISTORTION (%)

FIG.11B
EXAMPLE 9
ω=18.5°
—— SAGITTAL
---- TANGENTIAL
ASTIGMATISM (mm)

FIG.11A
EXAMPLE 9
F=5.98
435nm
650nm
546nm
SPHERICAL ABERRATION (mm)

IMAGE READOUT LENS

RELATED APPLICATIONS

This application claims the priority of Japanese Patent Application No. 10-299670 filed on Oct. 21, 1998, which is incorporated herein by reference.

BACKGROUND OF THE INVENTION

1. Field of the Invention

The present invention relates to an image readout lens used for reducing or magnifying an image in an optical system of an image readout apparatus such as image scanner; and, in particular, to an image readout lens with a simple configuration composed of three lens elements.

2. Description of the Prior Art

In a color image readout optical system, employed in an image scanner or the like, of a type adapted to form a reduced or magnified image of an original onto an imaging device such as CCD, a three-element lens has conventionally been known as one which attains a smaller size and lower cost with a simple configuration.

Recently, as demands for this three-element lens to reduce its cost and weight have been increasing, an image readout lens using a plastic as its lens material has been known to fulfill these demands. Though a plastic lens is mainly advantageous in terms of its light weight and low cost as well as its easiness to be processed into an aspheric surface, favorable performances are hard to maintain due to its strong temperature dependence and large deviations of imaging positions upon changes in temperature.

Though conventional examples of a three-element image readout lens are disclosed in Japanese Unexamined Patent Publication Nos. 4-288512 and 4-296808, for instance, they are still insufficient in terms of resolution.

SUMMARY OF THE INVENTION

In view of such circumstances, it is an object of the present invention to provide a high-resolution image readout lens which reduces its cost and weight by using a plastic material and also suppresses deviations in its imaging position which occur as a characteristic feature of the plastic material upon changes in temperature.

In one aspect, the image readout lens in accordance with the present invention comprises, successively from an object side, a first lens with a positive refracting power having a convex surface directed onto the object side, a second lens made of a biconcave lens, and a third lens with a positive refracting power having a convex surface directed onto an image side, at least one of the lenses being made of a plastic material, the image readout lens satisfying the following conditional expressions (1) and (2):

$$0.08 < D_6/F < 0.2 \tag{1}$$

$$0.2 < R_4/F < 1.2 \tag{2}$$

where $D_6$ is the center thickness of the third lens;
$R_4$ is the radius of curvature of the image-side surface of the second lens; and
F is the focal length of the whole lens system.

Preferably, the second lens is made of a plastic material, and at least one surface thereof is formed as a divergent aspheric surface.

In another aspect, the image readout lens in accordance with the present invention comprises, successively from an object side, a first lens with a positive refracting power having a convex surface directed onto the object side, a second lens made of a biconcave lens, and a third lens with a positive refracting power having a convex surface directed onto an image side, the first and second lenses being made of a plastic material, the image readout lens satisfying the following conditional expressions (1) and (3) to (5):

$$0.08 < D_6/F < 0.2 \tag{1}$$

$$1.5 < |R_6|/F < 2.2 \tag{3}$$

$$0.5 < R_2/F < 1.55 \tag{4}$$

$$0.5 < R_4/F < 1.2 \tag{5}$$

where $D_6$ is the center thickness of the third lens;
$R_2$ is the radius of curvature of the image-side surface of the first lens;
$R_4$ is the radius of curvature of the image-side surface of the second lens;
$R_6$ is the radius of curvature of the object-side surface of the third lens; and
F is the focal-length of the whole lens system.

Preferably, at least one surface of the second lens is formed as a divergent aspheric surface.

Preferably, this image readout lens further satisfies the following conditional expression (6):

$$0.3 < F_1 \times F_3/F^2 < 0.4 \tag{6}$$

where $F_i$ (i =1 to 3) is the focal length of the i-th lens; and
F is the focal length of the whole lens system.

It is more preferable that this image readout lens further satisfy the following conditional expressions (7) and (8):

$$-4.5 < F_h/F < -2.0 \tag{7}$$

$$\nu_2 < 33.0 \tag{8}$$

where $F_h$ is the composite focal length of the first and second lenses;
$\nu_2$ is the Abbe number of the second lens; and
F is the focal length of the whole lens system.

In still another aspect, the image readout lens in accordance with the present invention comprises, successively from an object side, a first lens with a positive refracting power having a convex surface directed onto the object side, a second lens made of a biconcave lens, and a third lens with a positive refracting power having a convex surface directed onto an image side, the second and third lenses being made of a plastic material, the image readout lens satisfying the following conditional expressions (1) and (9) to (11):

$$0.08 < D_6/F < 0.2 \tag{1}$$

$$0.3 < R_1/F < 0.45 \tag{9}$$

$$0.2 < R_5/F < 0.4 \quad (10)$$

$$0.2 < |R_7|/F < 0.3 \quad (11)$$

where $D_6$ is the center thickness of the third lens;

$R_1$ is the radius of curvature of the object-side surface of the first lens;

$R_5$ is the radius of curvature of the image-side surface of the second lens;

$R_7$ is the radius of curvature of the image-side surface of the third lens; and F is the focal length of the whole lens system.

Preferably, at least one surface of the second lens is formed as a divergent aspheric surface.

DESCRIPTION OF THE PREFERRED EMBODIMENTS

In the following, first and second embodiments of the present invention will be explained with reference to the accompanying drawings.

Figure 1:
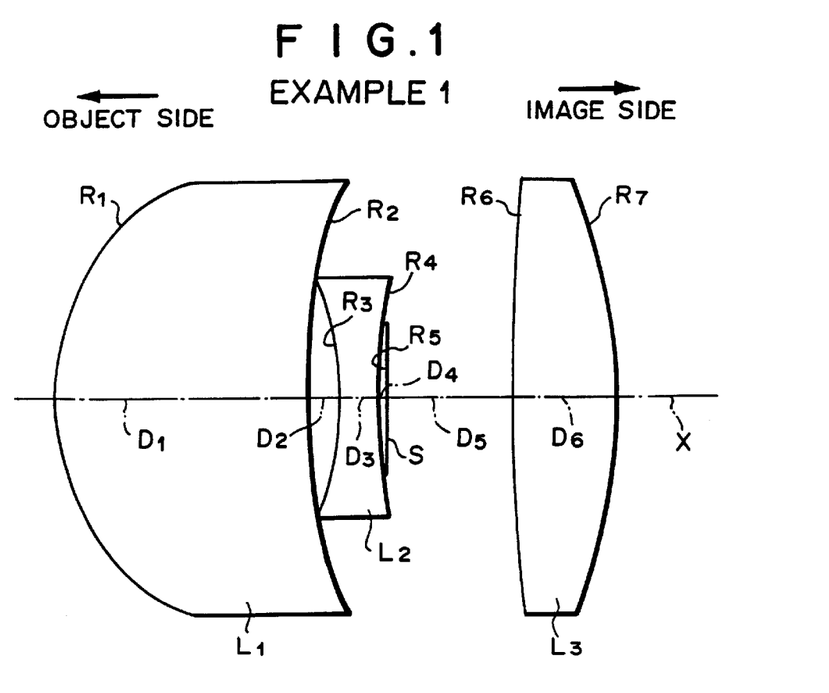
FIG. 1 is a view showing the configuration of the image readout lens in accordance with Example 1.

Here, FIG. 1 shows the basic lens configuration of Example 1 as a representative of the first embodiment of the present invention.

As shown in FIG. 1, the image readout lens in accordance with the first embodiment comprises, successively from the object side, a first lens $L_1$ made of a positive meniscus lens having a convex surface directed onto the object side, a second lens $L_2$ made of a biconcave lens having a surface with a greater curvature directed onto the object side, and a third lens $L_3$ made of a biconvex lens having a surface with a greater curvature directed onto the image side. The first lens $L_1$ and the second lens $L_2$ are made of a plastic material, whereas a stop S is disposed between the second lens $L_2$ and the third lens $L_3$. Here, X indicates the optical axis in FIG. 1.

In the image readout lens in accordance with the first embodiment, predetermined surfaces of the first lens $L_1$ and second lens $L_2$ are provided with aspheric surfaces represented by the following aspheric surface expression. As an aspherical lens is used, while a high-performance image readout lens can be attained in a simple configuration composed of three elements, the convergent aspheric surface of the first lens $L_1$ mainly contributes to an improvement in distortion, and the divergent aspheric surface of the second lens $L_2$ mainly contributes to improvements in coma and spherical aberration.

$$Z = \frac{C \times P^2}{1 + \sqrt{1 - K(C \times P)^2}} + \sum_{i=2}^{4} A_{2i} P^{2i}$$

where

Z is the length of the perpendicular to the tangential plane (the plane perpendicular to the optical axis) of an apex of the aspheric surface from a point on the aspheric surface at a distance P from the optical axis;

C is the reciprocal of the paraxial radius of curvature of the aspheric surface;

P is the distance from the optical axis represented by $X^2 + Y^2$;

K is the eccentricity; and $A_{2i}$ is the aspheric surface coefficient (i=2 to 4).

As at least one of the three lenses is made of a plastic lens material, the image readout lens can reduce its weight and cost. Though increasing the number of lenses can further reduce the weight and cost, the problem of temperature dependence will be too serious and corrections will be difficult if all of the three lenses are plastic lenses. Therefore, it is desirable that two lenses be plastic lenses, and the remaining one lens be made of a material not influenced by temperature.

Here, if a lens having the above-mentioned aspheric surface is a plastic lens, the manufacture cost can further be lowered since it is easy to process.

Also, the image readout lens in accordance with the first embodiment satisfies the following conditional expressions (1) to (4) and (6) to (8):

$$0.08 < D_6/F < 0.2 \quad (1)$$

$$0.2 < R_4/F < 1.2 \quad (2)$$

$$1.5 < |R_6|/F < 2.2 \quad (3)$$

$$0.5 < R_2/F < 1.55 \quad (4)$$

$$0.3 < F_1 \times F_3/F^2 < 0.4 \quad (6)$$

$$-4.5 < F_h/F < -2.0 \quad (7)$$

$$v_2 < 33.0 \quad (8)$$

where $F_i$ (i=1 to 3) is the focal length of the i-th lens $L_i$;

$R_2$ is the radius of curvature of the image-side surface of the first lens L1;

$R_4$ is the radius of curvature of the image-side surface of the second lens $L_2$;

$R_6$ is the radius of curvature of the object-side surface of the third lens $L_3$;

$D_6$ is the center thickness of the third lens $L_3$;

$\nu_2$ is the Abbe number of the second lens $L_2$;

$F_h$ is the composite focal length of the first lens $L_1$ and second lens $L_2$; and F is the focal length of the whole lens system.

The individual conditional expressions will now be explained.

Conditional expression (1) defines the center thickness of the third lens $L_3$. Outside this range, higher-order aberrations such as coma are hard to correct.

Conditional expression (2) defines the radius of curvature of the image-side surface of the second lens $L_2$. Outside this range, higher-order aberrations such as coma may be hard to correct. Here, corrections of higher-order aberrations such as coma can further be improved if the numerical range defined by this conditional expression (2) is narrowed to the following conditional expression (5):

$$0.5 < R_4/F < 1.2 \quad (5)$$

where $R_4$ is the radius of curvature of the image-side surface of the second lens $L_2$; and F is the focal length of the whole lens system.

Conditional expressions (3) and (4) define the radii of curvature of the object-side surface of the third lens $L_3$ and the image-side surface of the first lens $L_1$, respectively. Distortion may shift too much to the under side if the lower limit is not satisfied, whereas it may shift too much to the over side if the upper limit is exceeded, whereby it will be hard to correct.

Conditional expression (6) is one for appropriately distributing the focal lengths of the positive first and third lenses $L_1$, $L_3$. When they are distributed as such, coma, astigmatism, and distortion can favorably be corrected. Outside this numerical range, the above-mentioned individual aberrations are hard to correct in a well-balanced fashion.

Conditional expression (7) is one for appropriately distributing the refracting powers of the first lens $L_1$ and second lens $L_2$ made of a plastic material. When they are distributed as such, the fluctuation in image surface upon changes in temperature can be suppressed to a low level.

Conditional expression (8) defines the Abbe number of the second lens $L_2$ made of a plastic material. If the upper limit is exceeded, axial chromatic aberration and chromatic aberration in magnification may become likely to occur, or no appropriate resin material may be found.

Regardless of whether conditional expression (6) is satisfied or not, the above-mentioned conditional expressions (7) and (8) yield similar effects.

It is more desirable that the image readout lens in accordance with the first embodiment satisfy the condition of the following conditional expression (12) in addition to each condition of conditional expressions (1) to (8). Conditional expression (12) defines the Abbe number of the first lens $L_1$. If its lower limit is not satisfied, axial chromatic aberration and chromatic aberration in magnification may become likely to occur, or no appropriate resin material may be found.

$$57 < \nu_1 \quad (12)$$

where $\nu_1$ is the Abbe number of the first lens $L_1$.

Next, the second embodiment of the present invention will be explained with reference to FIG. 2.

Figure 2:
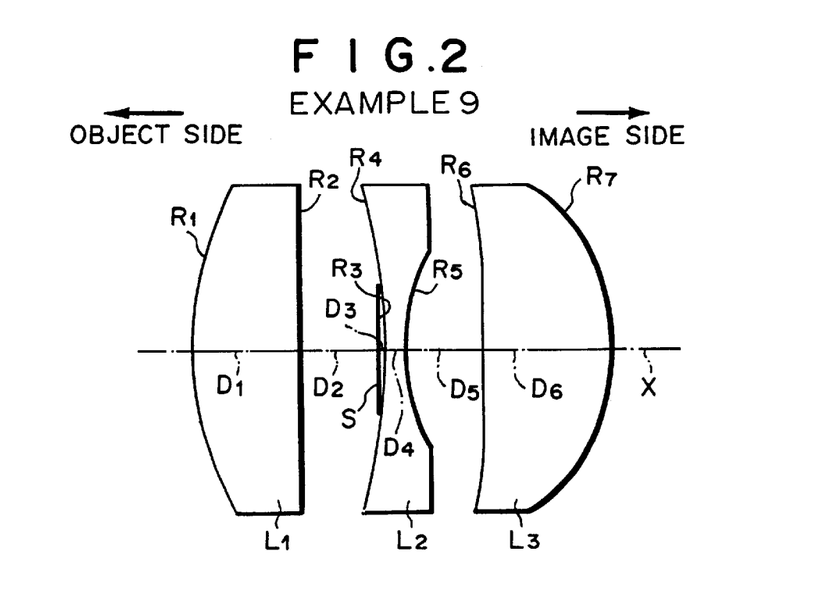
FIG. 2 is a view showing the configuration of the image readout lens in accordance with Example 9.
Figure 3A:
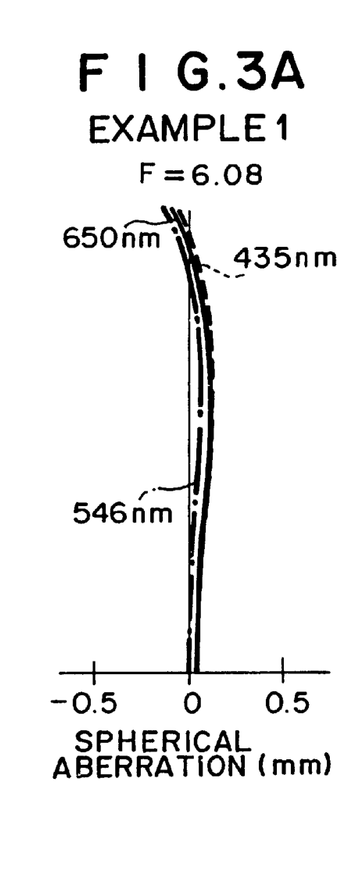
FIGS. 3A to 3C are aberration charts of the image readout lens in accordance with Example 1.
Figures 3B, 3C:
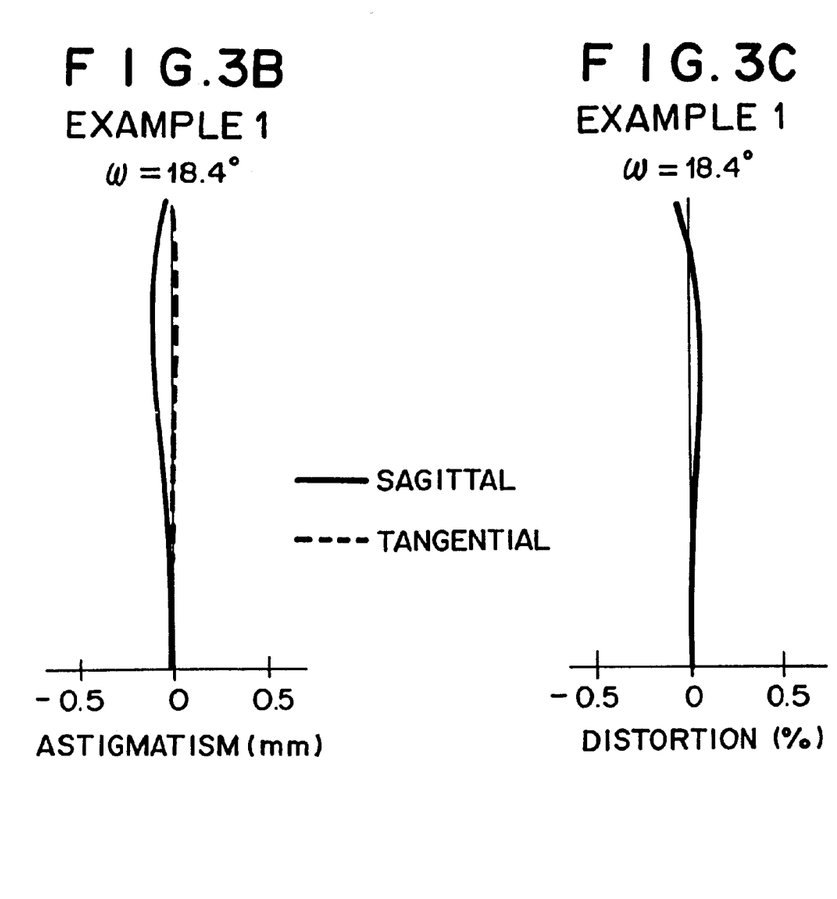
Figure 4A:
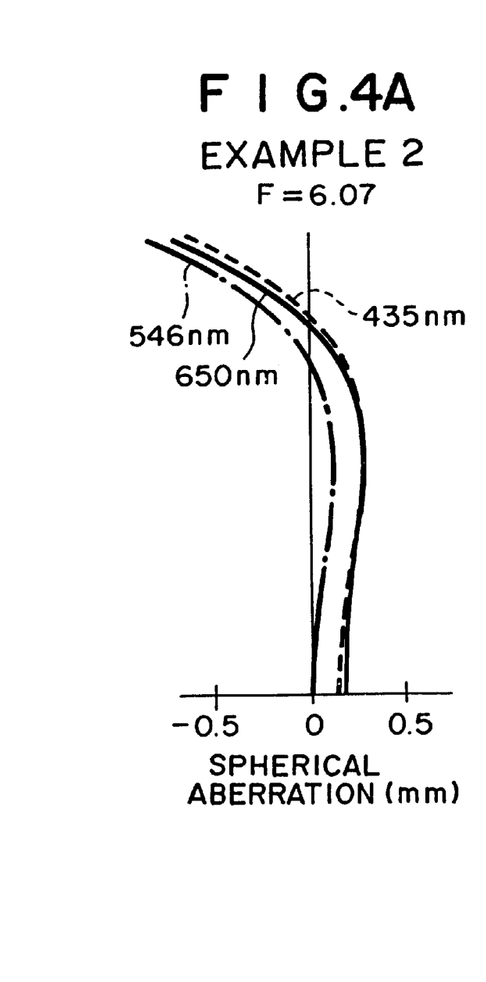
FIGS. 4A to 4C are aberration charts of the image readout lens in accordance with Example 2.
Figures 4B, 4C:
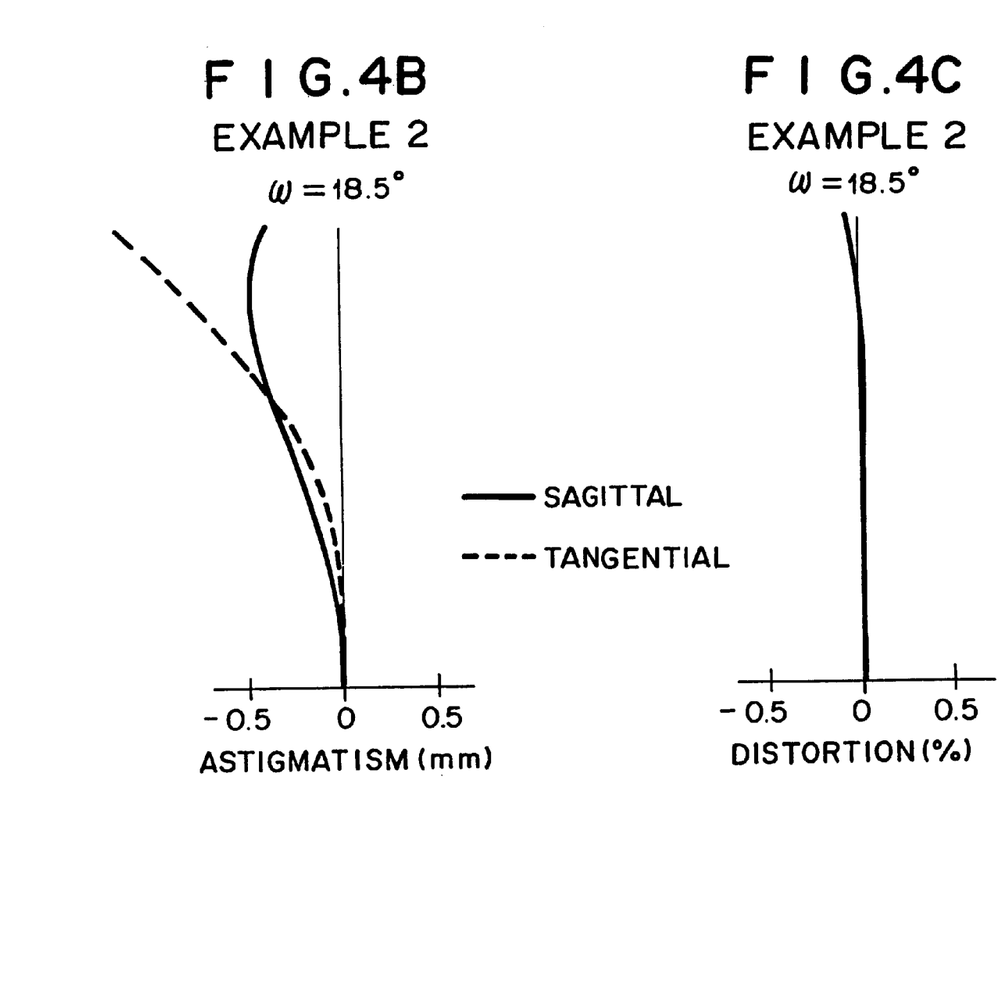
Figure 5A:
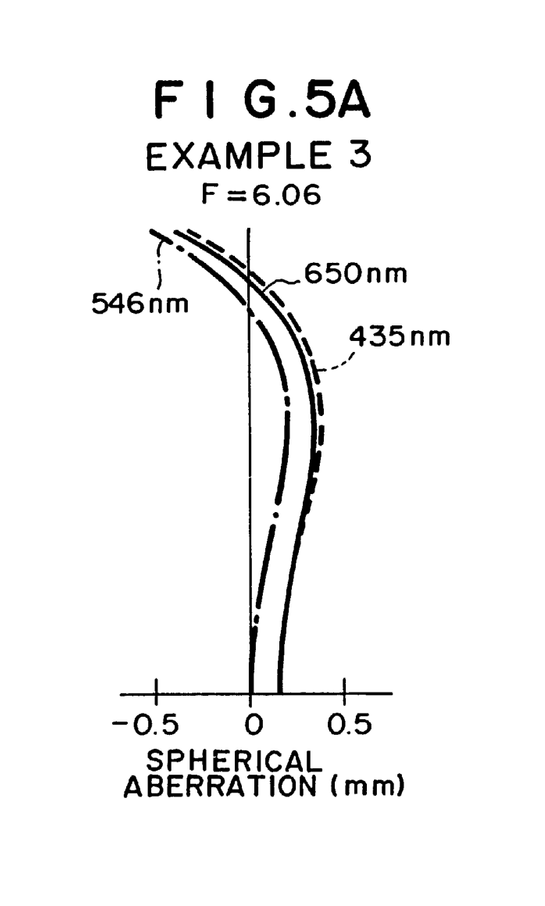
FIGS. 5A to 5C are aberration charts of the image readout lens in accordance with Example 3.
Figure 5B:
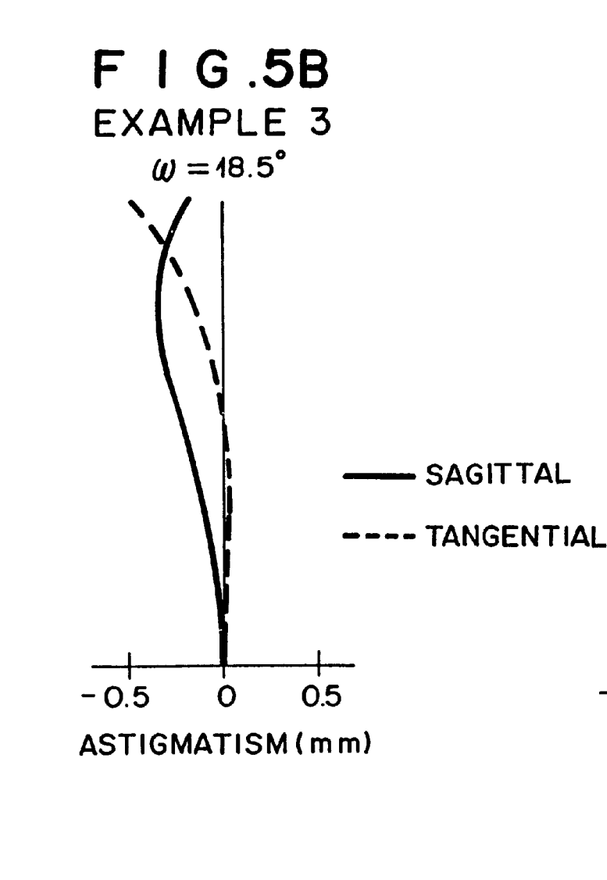
Figure 5C:
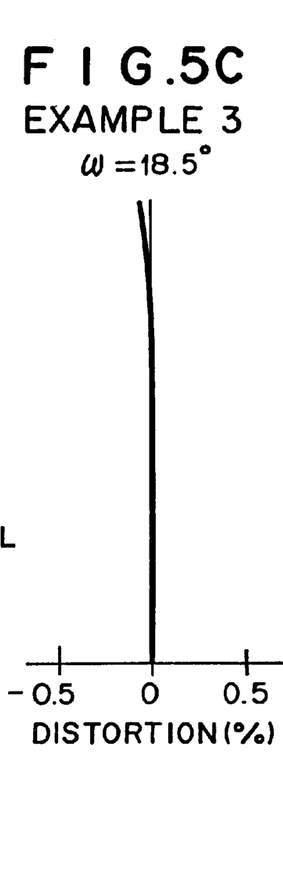
Figure 6A:
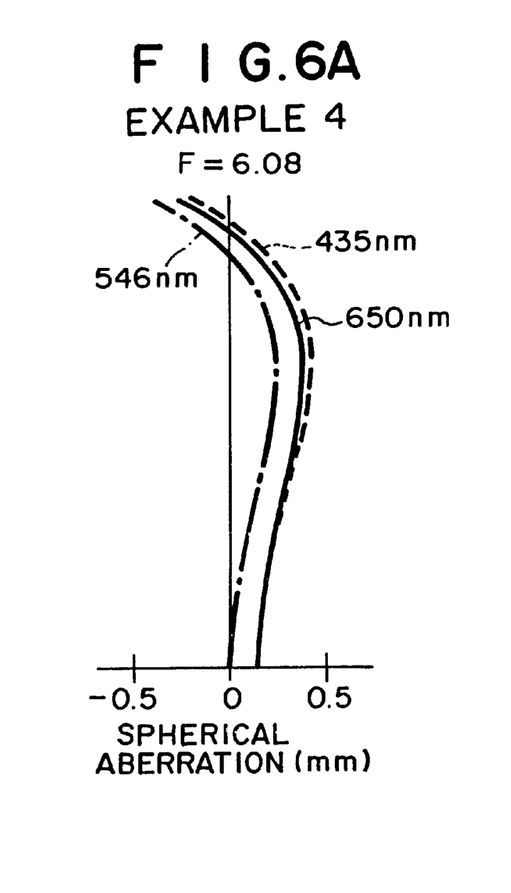
FIGS. 6A to 6C are aberration charts of the image readout lens in accordance with Example 4.
Figure 6B:
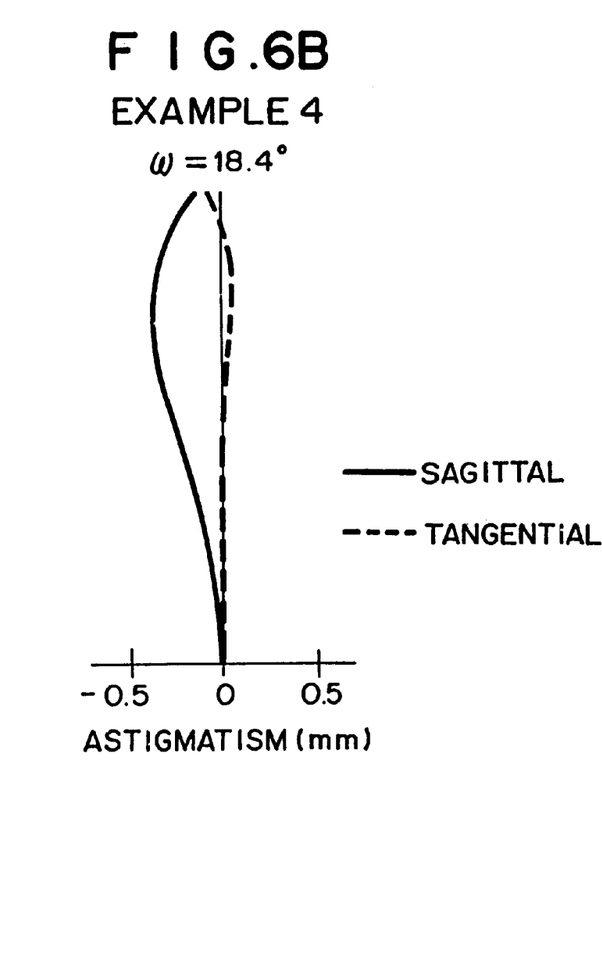
Figure 6C:
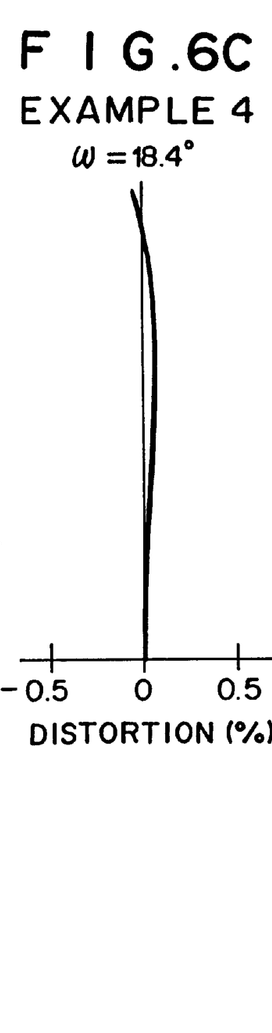
Figure 7A:
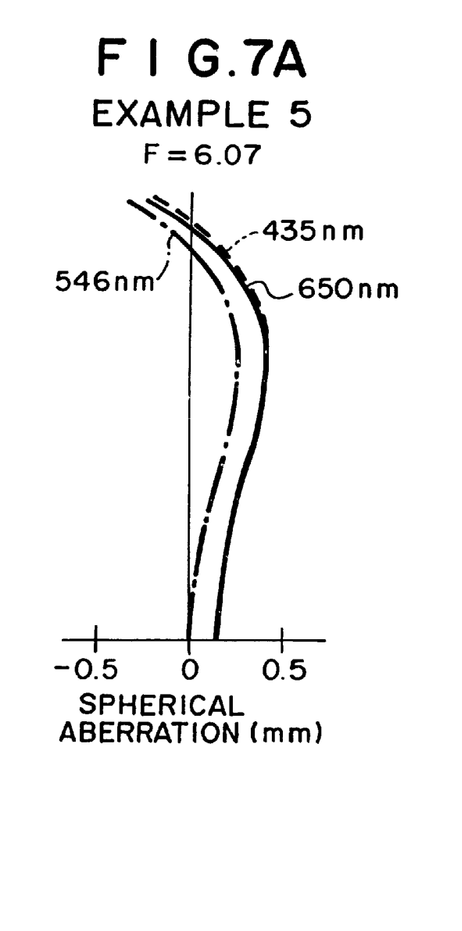
FIGS. 7A to 7C are aberration charts of the image readout lens in accordance with Example 5.
Figure 7B:
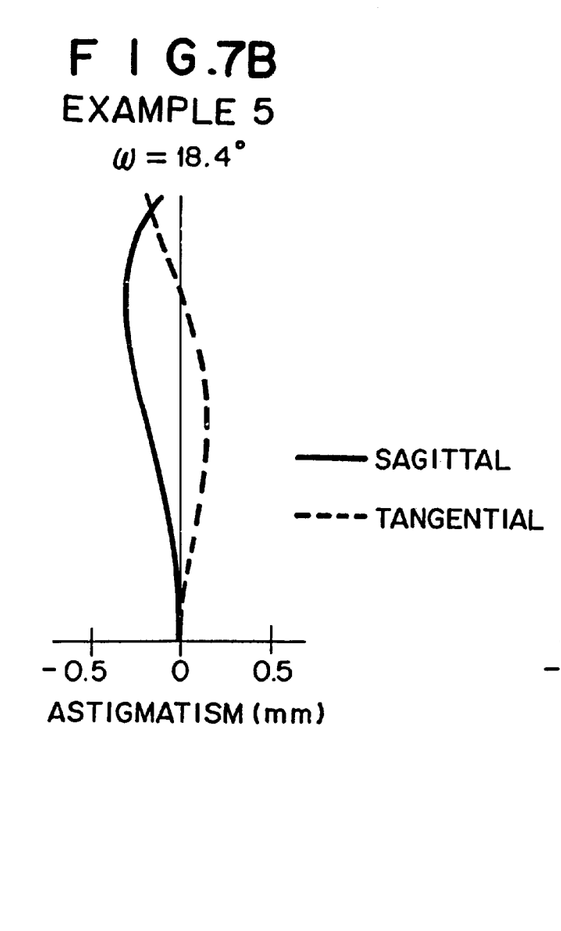
Figure 7C:
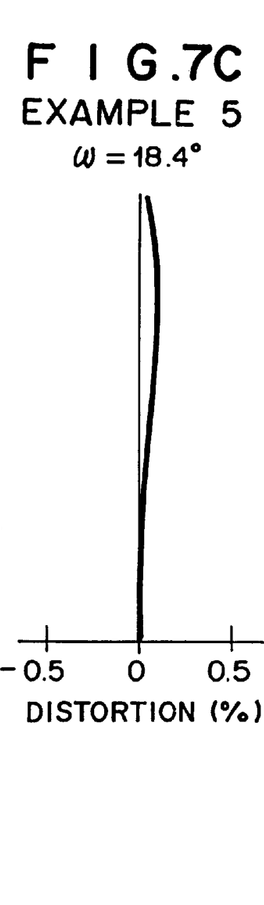
Figure 8A:
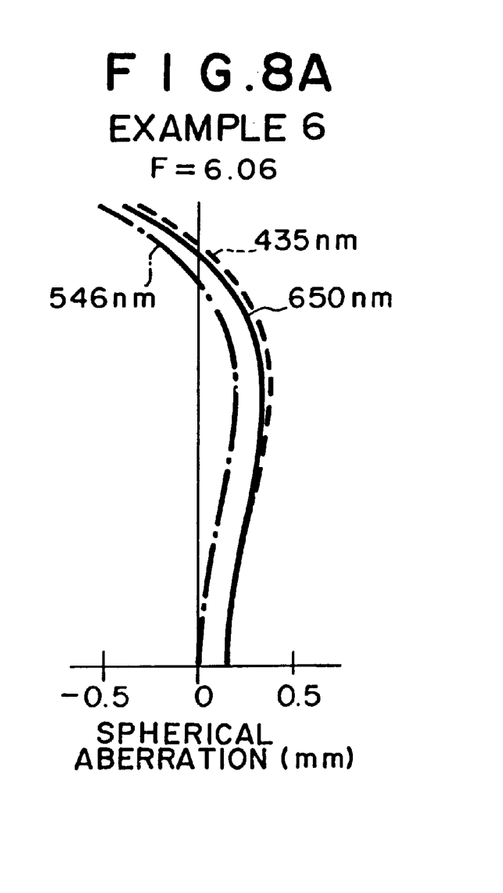
FIGS. 8A to 8C are aberration charts of the image readout lens in accordance with Example 6.
Figures 8B, 8C:
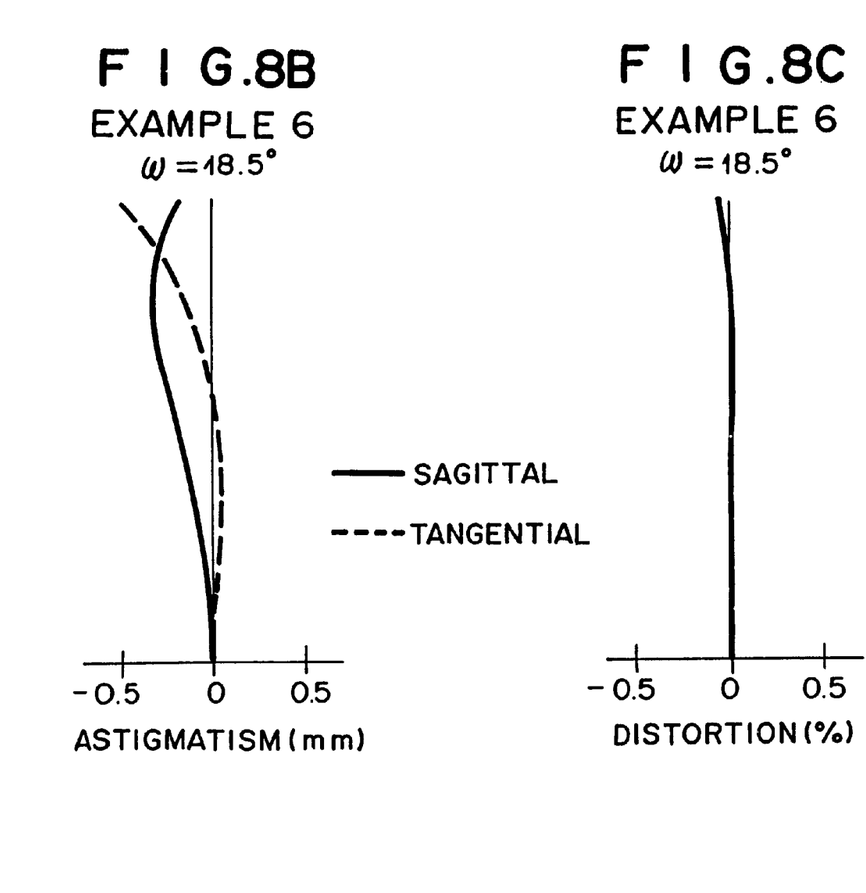
Figure 9A:
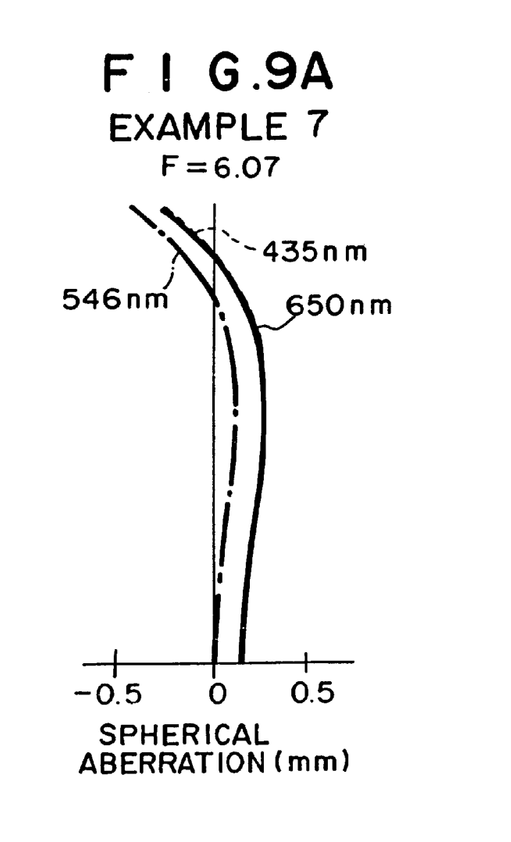
FIGS. 9A to 9C are aberration charts of the image readout lens in accordance with Example 7.
Figure 9B:
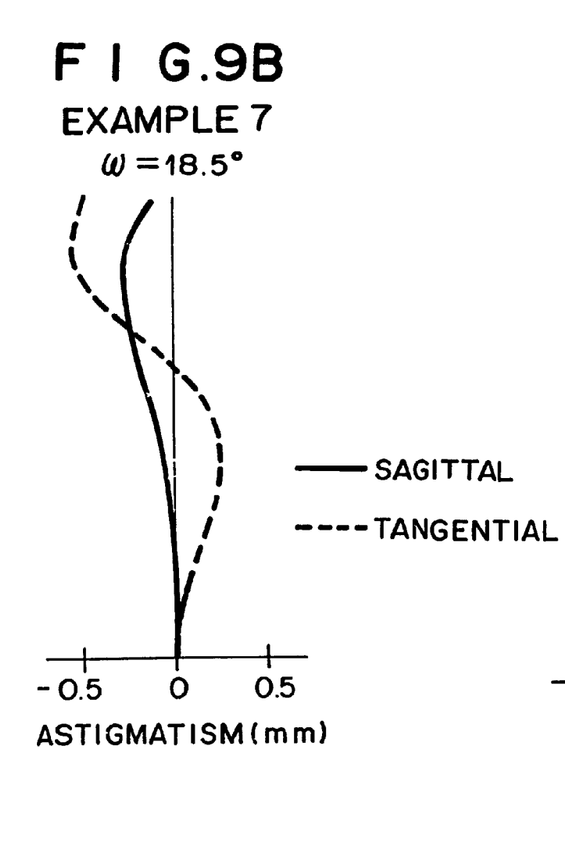
Figure 9C:
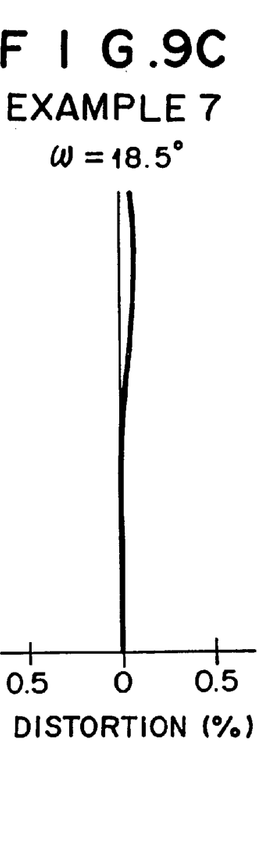
Figure 10A:
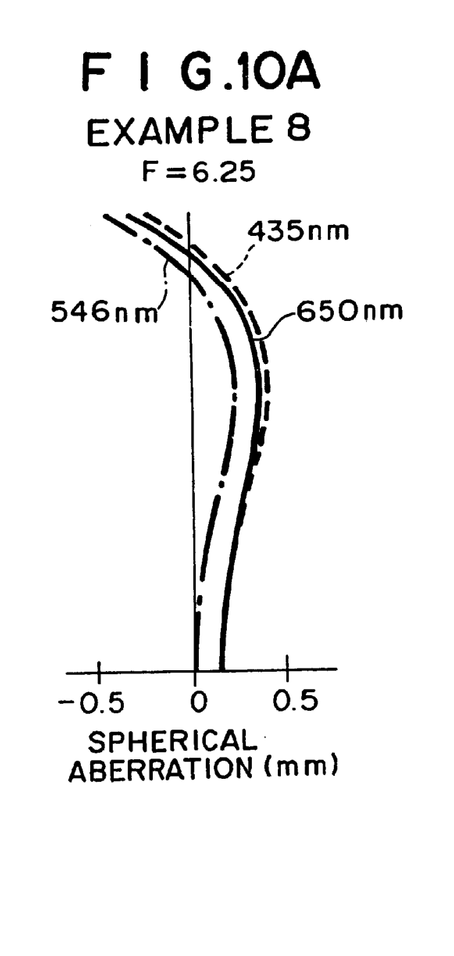
FIGS. 10A to 10C are aberration charts of the image readout lens in accordance with Example 8.
Figure 10B:
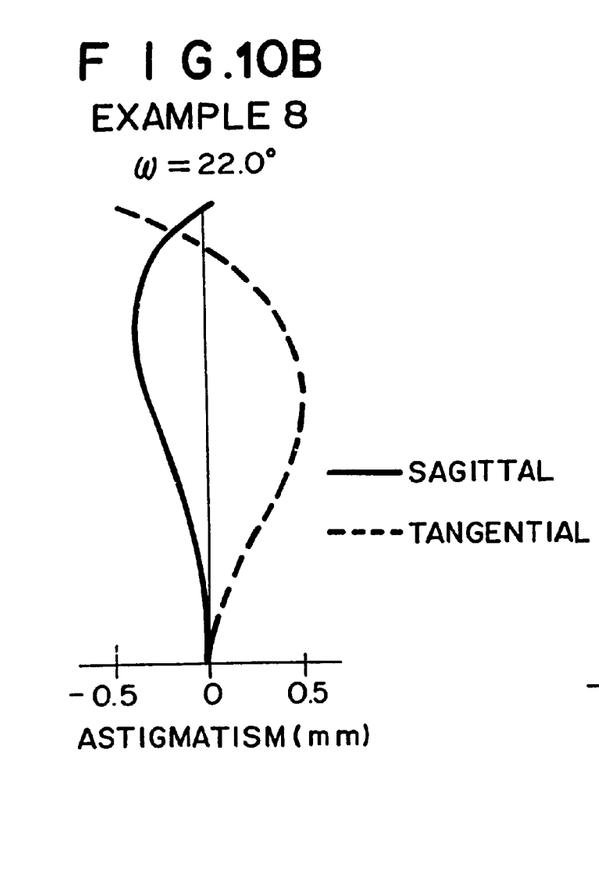
Figure 10C:
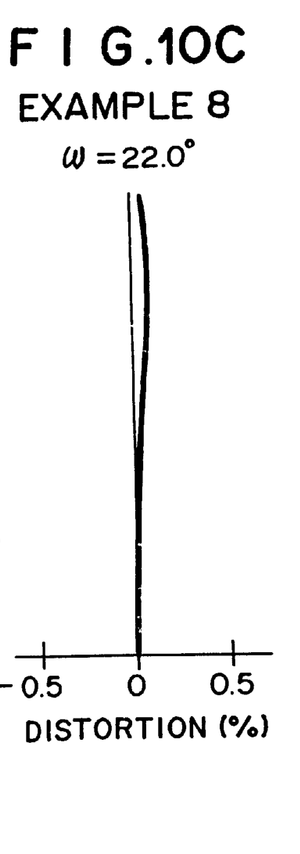
Figure 11A:
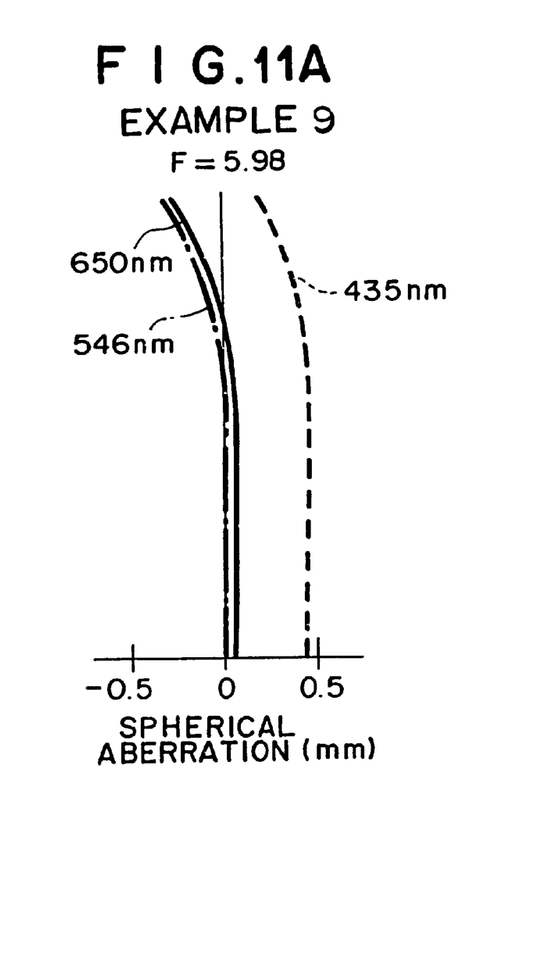
FIGS. 11A to 11C are aberration charts of the image readout lens in accordance with Example 9.
Figure 11B:
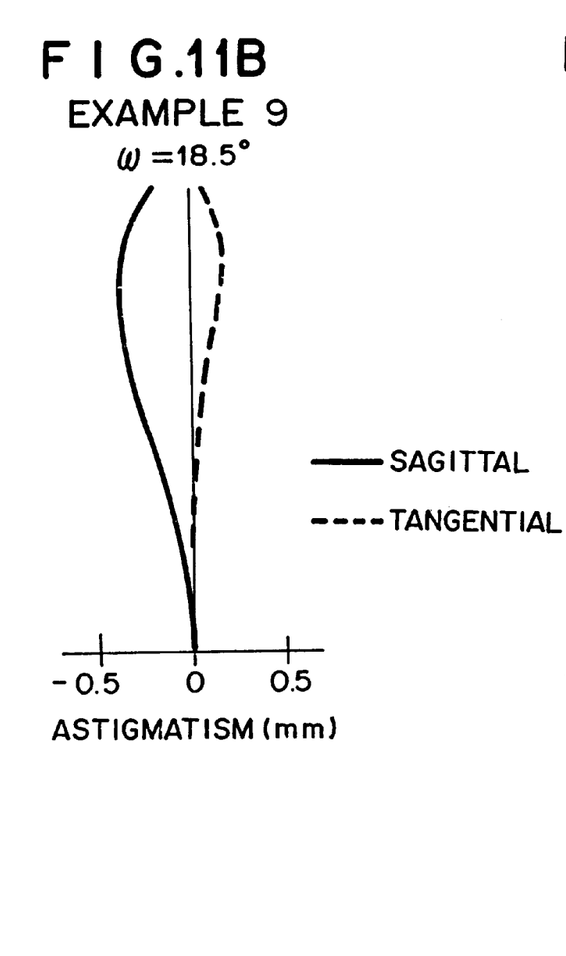
Figure 11C:
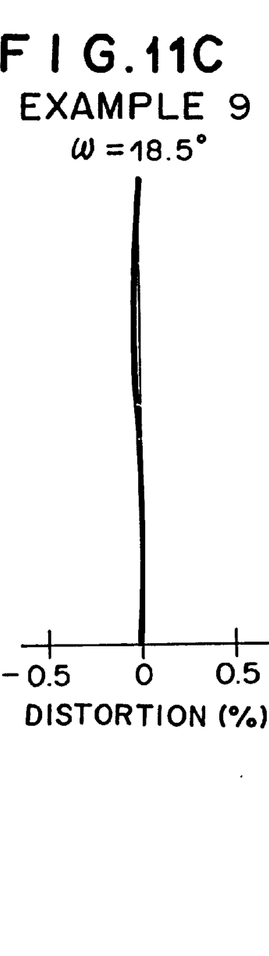

Here, FIG. 2 shows the basic lens configuration of Example 9 as a representative of the second embodiment of the present invention.

As shown in FIG. 2, the image readout lens in accordance with the second embodiment comprises, successively from the object side, a first lens $L_1$ made of a planoconvex lens having a convex surface directed onto the object side, a second lens $L_2$ made of a biconcave lens having a surface with a greater curvature directed onto the image side, and a third lens $L_3$ made of a biconvex lens having a surface with a greater curvature directed onto the image side. The second lens $L_2$ and the third lens $L_3$ are made of a plastic material, whereas a stop S is disposed between the first lens $L_1$ and the second lens $L_2$. Here, X indicates the optical axis in FIG. 2.

In the image readout lens in accordance with the second embodiment, predetermined surfaces of the second lens $L_2$ and third lens $L_3$ are provided with aspheric surfaces represented by an aspheric surface expression similar to that in the above-mentioned first embodiment.

The use of aspherical lenses and plastic lenses can yield effects similar to those of the first embodiment in the image readout lens in accordance with the second embodiment as well. Also, as with the first embodiment, the divergent aspheric surface of the second lens $L_2$ mainly contributes to improvements in coma and spherical aberration, whereas the convergent aspheric surface of the third lens $L_3$ mainly contributes to an improvement in distortion.

Also, the image readout lens in accordance with the second embodiment satisfies the following conditional expressions (1) and (9) to (11):

$$0.08 < D_6/F < 0.2 \quad (1)$$

$$0.3 < R_1/F < 0.45 \quad (9)$$

$$0.2 < R_5/F < 0.4 \quad (10)$$

$$0.2 < |R_7|/F < 0.3 \quad (11)$$

where $D_6$ is the center thickness of the third lens $L_3$;

$R_1$ is the radius of curvature of the object-side surface of the first lens Li;

$R_1$ is the radius of curvature of the image-side surface of the second lens $L_2$;

$R_7$ is the radius of curvature of the image-side surface of the third lens $L_3$; and F is the focal length of the whole lens system.

The individual conditional expressions will now be explained.

Conditional expression (9) defines the radius of curvature of the object-side surface of the first lens LI. If its lower limit is not satisfied, the processability of the lens surface may deteriorate, thus increasing the cost. If its upper limit is exceeded, higher-order aberrations such as coma may be hard to correct.

Conditional expression (10) defines the radius of curvature of the image-side surface of the second lens $L_2$. Outside this range, higher-order aberrations such as coma may be hard to correct.

Conditional expression (11) defines the radius of curvature of the image-side surface of the third lens $L_3$, and is a numerical range where coma, astigmatism, and distortion can favorably be corrected while taking account of the processability of the third lens $L_3$. Outside this numerical range, the above-mentioned individual aberrations may be hard to correct in a well-balanced fashion.

In the following, Examples 1 to 9 of the present invention will be explained specifically.

EXAMPLE 1

Table 1 shows the radius of curvature R (mm) of each lens surface, axial surface space of each lens (center thickness of each lens and air space between neighboring lenses) D (mm), refractive index N of each lens at e-line, and Abbe number ν of each lens in Example 1. Also, the lower part of Table 1 shows the focal length F (mm), magnification β, reference wavelength λ (nm), and half angle of view ω (degree) of the whole lens system in Example 1. In Table 1 and its subsequent Tables, the numbers referring to the letters successively increase from the object side, whereas "*" marked on the left side of numbers indicates an aspheric surface. Table 2 shows the respective values of constants in each aspheric surface indicated by the above-mentioned aspheric surface expression in Example 1.

TABLE 1

|   | Surface | R | D | $N_e$ | $ν_d$ |
|---|---|---|---|---|---|
| * | 1 | 23.89 | 20.34 | 1.4923 | 57.5 |
| * | 2 | 83.20 | 2.30 | | |
| * | 3 | -31.23 | 3.62 | 1.5883 | 30.3 |
| * | 4 | 67.82 | 0.36 | | |
|   | 5 | (stop) | 10.30 | | |
|   | 6 | 206.94 | 8.29 | 1.7162 | 53.9 |
|   | 7 | -50.44 | | | |

F = 100
β = -0.09449
λ = 546.070
ω = -18.633

TABLE 2

| Surface | K | $A_4$ | $A_6$ | $A_8$ |
|---|---|---|---|---|
| 1 | 1.6452009 | $-0.1002311 \times 10^{-5}$ | $-0.1048839 \times 10^{-8}$ | $-0.2510659 \times 10^{-11}$ |
| 2 | -8.8186767 | $0.1493939 \times 10^{-4}$ | $0.1158324 \times 10^{-8}$ | $0.1992260 \times 10^{-12}$ |
| 3 | 2.8169001 | $-0.8721766 \times 10^{-5}$ | $0.2844802 \times 10^{-9}$ | $0.2323274 \times 10^{-12}$ |
| 4 | 0.7363352 | $-0.1813194 \times 10^{-5}$ | $0.5182259 \times 10^{-9}$ | $0.3473458 \times 10^{-13}$ |

EXAMPLE 2

The image readout lens in accordance with Example 2 has substantially the same configuration as that of Example 1.

Table 3 shows the radius of curvature R (mm) of each lens surface, axial surface space of each lens (center thickness of each lens and air space between neighboring lenses) D (mm), refractive index N of each lens at e-line, and Abbe number ν of each lens in Example 2. Also, the lower part of Table 3 shows the focal length F (mm), magnification β, reference wavelength λ (nm), and half angle of view ω (degree) of the whole lens system in Example 2. Further, Table 4 shows the respective values of constants in each aspheric surface indicated by the above-mentioned aspheric surface expression in Example 2.

TABLE 3

|   | Surface | R | D | $N_e$ | $ν_d$ |
|---|---|---|---|---|---|
| * | 1 | 24.10 | 19.47 | 1.4923 | 57.5 |
| * | 2 | 57.60 | 2.81 | | |
| * | 3 | -27.79 | 3.62 | 1.5883 | 30.3 |
| * | 4 | 100.23 | 0.36 | | |
|   | 5 | (stop) | 7.61 | | |
|   | 6 | 210.40 | 8.97 | 1.7162 | 53.9 |
|   | 7 | -43.90 | | | |

F = 100
β = -0.09449
λ = 546.070
ω = -18.651

TABLE 4

| Surface | K | $A_4$ | $A_6$ | $A_8$ |
|---|---|---|---|---|
| 1 | 1.7216907 | $-0.1283505 \times 10^{-5}$ | $0.1155190 \times 10^{-8}$ | $-0.1509582 \times 10^{-10}$ |
| 2 | -12.9218207 | $0.1537746 \times 10^{-4}$ | $0.4118181 \times 10^{-8}$ | $0.3143229 \times 10^{-12}$ |
| 3 | 1.0272158 | $-0.1815969 \times 10^{-4}$ | $0.8323786 \times 10^{-9}$ | $0.4492697 \times 10^{-12}$ |
| 4 | 0.8565142 | $0.1098808 \times 10^{-5}$ | $0.1456882 \times 10^{-8}$ | $0.9761226 \times 10^{-13}$ |

EXAMPLE 3

The image readout lens in accordance with Example 3 has substantially the same configuration as that of Example 1.

Table 5 shows the radius of curvature R (mm) of each lens surface, axial surface space of each lens (center thickness of each lens and air space between neighboring lenses) D (mm), refractive index N of each lens at e-line, and Abbe number ν of each lens in Example 3. Also, the lower part of Table 5 shows the focal length F (mm), magnification β, reference wavelength λ (nm), and half angle of view ω (degree) of the whole lens system in Example 3. Further, Table 6 shows the respective values of constants in each aspheric surface indicated by the above-mentioned aspheric surface expression in Example 3.

TABLE 5

|   | Surface | R | D | $N_e$ | $ν_d$ |
|---|---|---|---|---|---|
| * | 1 | 24.63 | 20.41 | 1.4923 | 57.5 |
| * | 2 | 62.76 | 2.63 | | |

TABLE 5-continued

| | Surface | R | D | $N_e$ | $v_d$ |
|---|---|---|---|---|---|
| * | 3 | −29.42 | 3.62 | 1.5883 | 30.3 |
| * | 4 | 79.29 | 0.36 | | |
| | 5 | (stop) | 6.66 | | |
| | 6 | 181.55 | 12.93 | 1.7162 | 53.9 |
| | 7 | −44.67 | | | |

F = 100
β = −0.09449
λ = 546.070
ω = −18.659

TABLE 6

| Surface | K | $A_4$ | $A_6$ | $A_8$ |
|---|---|---|---|---|
| 1 | 1.7038890 | −0.1017756 × $10^{-5}$ | 0.3696271 × $10^{-9}$ | −0.7811181 × $10^{-11}$ |
| 2 | −9.7285309 | 0.1547195 × $10^{-4}$ | 0.2107858 × $10^{-8}$ | 0.2281300 × $10^{-12}$ |
| 3 | 2.1766105 | −0.1188108 × $10^{-4}$ | 0.3234030 × $10^{-9}$ | 0.2771647 × $10^{-12}$ |
| 4 | 0.6850973 | −0.2017066 × $10^{-5}$ | 0.8566413 × $10^{-9}$ | 0.5543184 × $10^{-13}$ |

EXAMPLE 4

The image readout lens in accordance with Example 4 has substantially the same configuration as that of Example 1, except that only the object-side surface is shaped into an aspheric surface in the second lens $L_2$.

Table 7 shows the radius of curvature R (mm) of each lens surface, axial surface space of each lens (center thickness of each lens and air space between neighboring lenses) D (mm), refractive index N of each lens at e-line, and Abbe number ν of each lens in Example 4. Also, the lower part of Table 7 shows the focal length F (mm), magnification β, reference wavelength λ (nm), and half angle of view ω (degree) of the whole lens system in Example 4. Further, Table 8 shows the respective values of constants in each aspheric surface indicated by the above-mentioned aspheric surface expression in Example 4.

TABLE 7

| | Surface | R | D | $N_e$ | $v_d$ |
|---|---|---|---|---|---|
| * | 1 | 23.87 | 20.38 | 1.4923 | 57.5 |
| * | 2 | 82.99 | 2.33 | | |
| * | 3 | −30.90 | 3.62 | 1.5883 | 30.3 |
| | 4 | 69.05 | 0.36 | | |
| | 5 | (stop) | 10.10 | | |
| | 6 | 196.51 | 8.33 | 1.7162 | 53.9 |
| | 7 | −50.94 | | | |

F = 100
β = −0.09449
λ = 546.070
ω = −18.637

TABLE 8

| Surface | K | $A_4$ | $A_6$ | $A_8$ |
|---|---|---|---|---|
| 1 | 1.6341962 | −0.9953870 × $10^{-6}$ | −0.9370921 × $10^{-9}$ | −0.2466861 × $10^{-11}$ |
| 2 | −8.8621846 | 0.1383991 × $10^{-4}$ | 0.1126864 × $10^{-8}$ | 0.1849443 × $10^{-12}$ |
| 3 | 2.4700385 | −0.8044464 × $10^{-5}$ | 0.2586761 × $10^{-9}$ | 0.2136060 × $10^{-12}$ |

EXAMPLE 5

The image readout lens in accordance with Example 5 has substantially the same configuration as that of Example 1, except that only both surfaces of the first lens $L_1$ are shaped into aspheric surfaces.

Table 9 shows the radius of curvature R (mm) of each lens surface, axial surface space of each lens (center thickness of each lens and air space between neighboring lenses) D (mm), refractive index N of each lens at e-line, and Abbe number ν of each lens in Example 5. Also, the lower part of Table 9 shows the focal length F (mm), magnification β, reference wavelength λ (nm), and half angle of view ω (degree) of the whole lens system in Example 5. Further, Table 10 shows the respective values of constants in each aspheric surface indicated by the above-mentioned aspheric surface expression in Example 5.

TABLE 9

| | Surface | R | D | $N_e$ | $v_d$ |
|---|---|---|---|---|---|
| * | 1 | 26.34 | 24.81 | 1.4923 | 57.5 |
| * | 2 | 150.96 | 1.98 | | |
| | 3 | −31.95 | 3.61 | 1.5883 | 30.3 |
| | 4 | 57.01 | 0.36 | | |
| | 5 | (stop) | 9.26 | | |
| | 6 | 176.61 | 13.83 | 1.7162 | 53.9 |
| | 7 | −49.63 | | | |

F = 100
β = −0.09449
λ = 546.070
ω = −18.624

TABLE 10

| Surface | K | $A_4$ | $A_6$ | $A_8$ |
|---|---|---|---|---|
| 1 | 1.5412986 | $-0.5338228 \times 10^{-6}$ | $0.1281412 \times 10^{-8}$ | $-0.2391352 \times 10^{-11}$ |
| 2 | -8.5768249 | $0.2064171 \times 10^{-4}$ | $0.1612681 \times 10^{-8}$ | $0.2273726 \times 10^{-12}$ |

EXAMPLE 6

The image readout lens in accordance with Example 6 has substantially the same configuration as that of Example 4.

Table 11 shows the radius of curvature R (mm) of each lens surface, axial surface space of each lens (center thickness of each lens and air space between neighboring lenses) D (mm), refractive index N of each lens at e-line, and Abbe number ν of each lens in Example 6. Also, the lower part of Table 11 shows the focal length F (mm), magnification β, reference wavelength λ (nm), and half angle of view ω (degree) of the whole lens system in Example 6. Further, Table 12 shows the respective values of constants in each aspheric surface indicated by the above-mentioned aspheric surface expression in Example 6.

EXAMPLE 7

The image readout lens in accordance with Example 7 has substantially the same configuration as that of Example 5.

Table 13 shows the radius of curvature R (mm) of each lens surface, axial surface space of each lens (center thickness of each lens and air space between neighboring lenses) D (mm), refractive index N of each lens at e-line, and Abbe number ν of each lens in Example 7. Also, the lower part of Table 13 shows the focal length F (mm), magnification β, reference wavelength λ (nm), and half angle of view ω (degree) of the whole lens system in Example 7. Further, Table 14 shows the respective values of constants in each aspheric surface indicated by the above-mentioned aspheric surface expression in Example 7.

TABLE 11

| | Surface | R | D | $N_e$ | $\nu_d$ |
|---|---|---|---|---|---|
| * | 1 | 24.58 | 20.30 | 1.4923 | 57.5 |
| * | 2 | 62.40 | 2.67 | | |
| * | 3 | -28.77 | 3.62 | 1.5883 | 30.3 |
| | 4 | 84.63 | 0.36 | | |
| | 5 | (stop) | 6.64 | | |
| | 6 | 181.50 | 12.72 | 1.7162 | 53.9 |
| | 7 | -44.72 | | | |

F = 100
β = 0.09449
λ = -546.070
ω = -18.659

TABLE 13

| | Surface | R | D | $N_e$ | $\nu_d$ |
|---|---|---|---|---|---|
| * | 1 | 29.74 | 28.37 | 1.4923 | 57.5 |
| * | 2 | 148.56 | 2.03 | | |
| | 3 | -31.22 | 3.61 | 1.5883 | 30.3 |
| | 4 | 58.81 | 0.36 | | |
| | 5 | (stop) | 7.49 | | |
| | 6 | 179.45 | 13.54 | 1.7162 | 53.9 |
| | 7 | -42.43 | | | |

F = 100
β = -0.09449
λ = 546.070
ω = -18.626

TABLE 12

| Surface | K | $A_4$ | $A_6$ | $A_8$ |
|---|---|---|---|---|
| 1 | 1.7045088 | $-1.0838060 \times 10^{-6}$ | $4.9470324 \times 10^{-10}$ | $-8.5901864 \times 10^{-12}$ |
| 2 | -10.1126455 | $1.4792198 \times 10^{-5}$ | $2.3361919 \times 10^{-9}$ | $2.4170023 \times 10^{-13}$ |
| 3 | 1.9160659 | $-1.1299042 \times 10^{-5}$ | $2.6026112 \times 10^{-10}$ | $2.8322124 \times 10^{-13}$ |

TABLE 14

| Surface | K | $A_4$ | $A_6$ | $A_8$ |
|---|---|---|---|---|
| 1 | 1.6591642 | $-1.0224877 \times 10^{-6}$ | $2.3637700 \times 10^{-9}$ | $-9.2592609 \times 10^{-12}$ |
| 2 | -10.1126455 | $1.4877839 \times 10^{-5}$ | $2.3587783 \times 10^{-9}$ | $2.4497801 \times 10^{-13}$ |

EXAMPLE 8

The image readout lens in accordance with Example 8 has substantially the same configuration as that of Example 1.

Table 15 shows the radius of curvature R (mm) of each lens surface, axial surface space of each lens (center thickness of each lens and air space between neighboring lenses) D (mm), refractive index N of each lens at e-line, and Abbe number ν of each lens in Example 8. Also, the lower part of Table 15 shows the focal length F (mm), magnification β, reference wavelength λ (nm), and half angle of view ω (degree) of the whole lens system in Example 8. Further, Table 16 shows the respective values of constants in each aspheric surface indicated by the above-mentioned aspheric surface expression in Example 8.

TABLE 15

| Surface | R | D | $N_e$ | $\nu_d$ |
|---|---|---|---|---|
| * 1 | 25.31 | 21.59 | 1.4923 | 57.5 |
| * 2 | 85.04 | 1.87 | | |
| * 3 | -34.11 | 3.63 | 1.5883 | 30.3 |
| * 4 | 68.34 | 0.36 | | |
| 5 | (stop) | 5.80 | | |
| 6 | 164.14 | 19.41 | 1.7162 | 53.9 |
| 7 | -52.43 | | | |

F = 100
β = -0.12598
λ = 546.070
ω = -22.253

TABLE 16

| Surface | K | $A_4$ | $A_6$ | $A_8$ |
|---|---|---|---|---|
| 1 | 1.6930602 | $-1.3866272 \times 10^{-6}$ | $1.3616466 \times 10^{-9}$ | $-7.1522933 \times 10^{-12}$ |
| 2 | -9.4252704 | $1.1984011 \times 10^{-5}$ | $2.1309004 \times 10^{-9}$ | $3.1575531 \times 10^{-13}$ |
| 3 | 3.0218919 | $-8.7196740 \times 10^{-6}$ | $1.9223711 \times 10^{-10}$ | $3.3175043 \times 10^{-13}$ |
| 4 | 0.6820940 | $-3.0810334 \times 10^{-6}$ | $1.0512048 \times 10^{-9}$ | $6.3564919 \times 10^{-14}$ |

Table 17 shows the respective values corresponding to conditional expressions (1) to (8) in each of Examples 1 to 8. As shown in Table 17, each of Examples 1 to 8 satisfies all the conditional expressions.

TABLE 17

| | | Example 1 | Example 2 | Example 3 | Example 4 |
|---|---|---|---|---|---|
| Conditional Expression (1) | $D_6/F$ | 0.0829 | 0.0897 | 0.1293 | 0.0833 |
| Conditional Expression (2),(5) | $R_4/F$ | 0.6782 | 1.0023 | 0.7929 | 0.6905 |
| Conditional Expression (3) | $|R_6|/F$ | 2.0694 | 2.1040 | 1.8155 | 1.9651 |

TABLE 17-continued

| | | | | | |
|---|---|---|---|---|---|
| Conditional Expression (4) | $R_2/F$ | 0.8320 | 0.5760 | 0.6276 | 0.8299 |
| Conditional Expression (6) | $F_1 \times F_3/F^2$ | 0.3510 | 0.3635 | 0.3590 | 0.3502 |
| Conditional Expression (7) | $F_b/F$ | -4.3034 | -2.1719 | -2.1729 | -4.3041 |
| Conditional Expression (8) | $\nu_2$ | 30.3 | 30.3 | 30.3 | 30.3 |

| | | Example 5 | Example 6 | Example 7 | Example 8 |
|---|---|---|---|---|---|
| Conditional Expression (1) | $D_6/F$ | 0.1383 | 0.1272 | 0.1354 | 0.1941 |
| Conditional Expression (2),(5) | $R_4/F$ | 0.5701 | 0.8463 | 0.5881 | 0.6834 |
| Conditional Expression (3) | $|R_6|/F$ | 1.7661 | 1.8150 | 1.7945 | 1.6415 |
| Conditional Expression (4) | $R_2/F$ | 1.5096 | 0.6240 | 1.4856 | 0.8504 |
| Conditional Expression (6) | $F_1 \times F_3/F^2$ | 0.3377 | 0.3592 | 0.3443 | 0.3770 |

TABLE 17-continued

| | | | | | |
|---|---|---|---|---|---|
| Conditional Expression (7) | $F_b/F$ | -4.3014 | -2.1729 | -2.1688 | -4.0297 |
| Conditional Expression (8) | $\nu_2$ | 30.3 | 30.3 | 30.3 | 30.3 |

EXAMPLE 9

The image readout lens in accordance with Example 9 is configured as mentioned in the second embodiment. In Example 9, the image-side surface of the second lens $L_2$ and both surfaces of the third lens $L_3$ are shaped into aspheric surfaces.

Table 18 shows the radius of curvature R (mm) of each lens surface, axial surface space of each lens (center thickness of each lens and air space between neighboring lenses) D (mm), refractive index N of each lens at e-line, and Abbe number ν of each lens in Example 9. Also, the lower part of Table 18 shows the focal length F (mm), magnification β, reference wavelength λ (nm), and half angle of view ω (degree) of the whole lens system in Example 9. Further, Table 19 shows the respective values of constants in each aspheric surface indicated by the above-mentioned aspheric surface expression in Example 9.

TABLE 18

| | Surface | R | D | $N_e$ | $\nu_d$ |
|---|---|---|---|---|---|
| | 1 | 40.02 | 12.03 | 1.7162 | 53.9 |
| | 2 | ∞ | 8.71 | | |
| | 3 | (stop) | 0.58 | | |
| | 4 | −68.07 | 2.36 | 1.5883 | 30.3 |
| * | 5 | 25.80 | 8.70 | | |
| * | 6 | 13896.75 | 14.29 | 1.4923 | 57.5 |
| * | 7 | −26.93 | | | |

F = 100
β = −0.09449
λ = 546.070
ω = −18.427

TABLE 19

| Surface | K | $A_4$ | $A_6$ | $A_8$ |
|---|---|---|---|---|
| 5 | 1.9191750 | $-1.6817486 \times 10^{-6}$ | $3.8987126 \times 10^{-10}$ | $1.3296576 \times 10^{-13}$ |
| 6 | −8.3993351 | $-9.1343560 \times 10^{-6}$ | $7.3380607 \times 10^{-10}$ | $-9.9361021 \times 10^{-14}$ |
| 7 | 1.7647680 | $-8.6068086 \times 10^{-7}$ | $-1.1532025 \times 10^{-9}$ | $1.5027847 \times 10^{-12}$ |

Table 20 shows the respective values corresponding to conditional expressions (1) and (9) to (11) in Example 9. As shown in Table 20, Example 9 satisfies all the conditional expressions.

TABLE 20

| | | Example 9 |
|---|---|---|
| Conditional Expression (1) | $D_6/F$ | 0.1429 |
| Conditional Expression (9) | $R_1/F$ | 0.4002 |
| Conditional Expression (10) | $R_5/F$ | 0.2580 |
| Conditional Expression (11) | $|R_7|/F$ | −0.2693 |

FIGS. 3 to 11 are aberration charts showing various aberrations (spherical aberration, astigmatism, and distortion) of their respective Examples. In these aberration charts, ω refers to the half angle of view.

As can be seen from FIGS. 3 to 11, it is clear that the image readout lenses in accordance with Examples 1 to 9 are high-performance image readout lenses which favorably correct various aberrations while in a simple lens configuration composed of three elements and have a minimized temperature dependence.

Without being restricted to the above-mentioned Examples, the image readout lens in accordance with the present invention can be modified in various manners. For example, the radius of curvature R and lens spacing (or lens thickness) D of each lens can be changed appropriately.

As explained in the foregoing, the present invention can provide a high-performance, high-resolution image readout lens which reduces its cost and weight by using a plastic material, which is inexpensive in terms of the cost per lens and can easily be shaped into an aspheric surface, and also suppresses deviations in its imaging position which occur as a characteristic feature of the plastic material upon changes in temperature.

What is claimed is:

1. An image readout lens comprising, successively from an object side, a first lens with a positive refracting power having a convex surface directed onto the object side, a second lens made of a biconcave lens, and a third lens with a positive refracting power having a convex surface directed onto an image side, at least one of said lenses being made of a plastic material, said image readout lens satisfying the following conditional expressions (1) and (2):

$$0.08 < D_6/F < 0.2 \quad (1)$$

$$0.2 < R_4/F < 1.2 \quad (2)$$

where $D_6$ is the center thickness of the third lens;

$R_4$ is the radius of curvature of the image-side surface of the second lens; and F is the focal length of the whole lens system; and wherein said second lens is made of a plastic material, at least one surface of said second lens being formed as a divergent aspheric surface.

2. An image readout lens comprising, successively from an object side, a first lens with a positive refracting power having a convex surface directed onto the object side, a second lens made of a biconcave lens, and a third lens with a positive refracting power having a convex surface directed onto an image side, said first and second lenses being made of a plastic material, said image readout lens satisfying the following conditional expressions (1) and (3) to (5):

$$0.08 < D_6/F < 0.2 \quad (1)$$

$$1.5 < |R_6|/F < 2.2 \quad (3)$$

$$0.5 < R_2/F < 1.55 \quad (4)$$

$$0.5 < R_4/F < 1.2 \quad (5)$$

where $D_6$ is the center thickness of the third lens;

$R_2$ is the radius of curvature of the image-side surface of the first lens;

$R_4$ is the radius of curvature of the image-side surface of the second lens;

$R_6$ is the radius of curvature of the object-side surface of the third lens; and F is the focal length of the whole lens system.

3. An image readout lens according to claim 2, wherein at least one surface of said second lens is formed as a divergent aspheric surface.

4. An image readout lens according to claim 2, further satisfying the following conditional expression (6):

$$0.3 < F_1 \times F_3 / F^2 < 0.4 \quad (6)$$

where $F_i$ (i=1 to 3) is the focal length of the i-th lens; and

F is the focal length of the whole lens system.

5. An image readout lens according to claim 4, wherein at least one surface of said second lens is formed as a divergent aspheric surface.

6. An image readout lens according to claim 2, further satisfying the following conditional expressions (7) and (8):

$$4.5 < F_h / F < -2.0 \quad (7)$$

$$\nu_2 < 33.0 \quad (8)$$

where $F_h$ is the composite focal length of the first and second lenses;

$\nu_2$ is the Abbe number of the second lens; and

F is the focal length of the whole lens system.

7. An image readout lens according to claim 6, wherein at least one surface of said second lens is formed as a divergent aspheric surface.

8. An image readout lens comprising, successively from an object side, a first lens with a positive refracting power having a convex surface directed onto the object side, a second lens made of a biconcave lens, and a third lens with a positive refracting power having a convex surface directed onto an image side, said second and third lenses being made of a plastic material, said image readout lens satisfying the following conditional expressions (1) and (9) to (11):

$$0.08 < D_6 / F < 0.2 \quad (1)$$

$$0.3 < R_1 / F < 0.45 \quad (9)$$

$$0.2 < R_5 / F < 0.4 \quad (10)$$

$$0.2 < |R_7| / F < 0.3 \quad (11)$$

where $D_6$ is the center thickness of the third lens;

$R_1$ is the radius of curvature of the object-side surface of the first lens;

$R_5$ is the radius of curvature of the image-side surface of the second lens;

$R_7$ is the radius of curvature of the image-side surface of the third lens; and F is the focal length of the whole lens system.

9. An image readout lens according to claim 8, wherein at least one surface of said second lens is formed as a divergent aspheric surface.

* * * * *